US012626484B2

(12) United States Patent
Jeong

(10) Patent No.: US 12,626,484 B2
(45) Date of Patent: May 12, 2026

(54) APPARATUS AND METHOD FOR IDENTIFYING AND DISPLAYING MATERIAL TYPES USING MULTI-ENERGY X-RAY BACKSCATTERING

(71) Applicant: Electronics and Telecommunications Research Institute, Daejeon (KR)

(72) Inventor: Ji Wook Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 267 days.

(21) Appl. No.: 18/664,207

(22) Filed: May 14, 2024

(65) Prior Publication Data

US 2025/0095333 A1      Mar. 20, 2025

(30) Foreign Application Priority Data

Sep. 19, 2023     (KR) ......................... 10-2023-0124968

(51) Int. Cl.
*G06V 10/74* (2022.01)
*G01N 23/203* (2006.01)
(Continued)

(52) U.S. Cl.
CPC ......... *G06V 10/761* (2022.01); *G01N 23/203* (2013.01); *G06T 7/70* (2017.01);
(Continued)

(58) Field of Classification Search
CPC .... G06V 10/761; G06V 10/143; G06V 10/30; G06V 20/50; G01N 23/203;
(Continued)

(56) References Cited

U.S. PATENT DOCUMENTS

2008/0095310 A1* 4/2008 Edwards .............. G01N 23/203
378/57
2014/0270066 A1* 9/2014 Magnuson ......... G01R 33/4812
378/62
(Continued)

FOREIGN PATENT DOCUMENTS

KR          10-1034753 B1      5/2011
KR     10-2020-0108895 A     9/2020
(Continued)

OTHER PUBLICATIONS

Cho H, Park H, Kim IJ, Cho J. Data Augmentation of Backscatter X-ray Images for Deep Learning-Based Automatic Cargo Inspection. Sensors (Basel). Nov. 2, 2021;21(21):7294. doi: 10.3390/s21217294. PMID: 34770600; PMCID: PMC8587046. (Year: 2021).*

*Primary Examiner* — Delomia L Gilliard
(74) *Attorney, Agent, or Firm* — BROADVIEW IP LAW, PC

(57)          ABSTRACT

Proposed is an apparatus and method for identifying and displaying material types using multi-energy X-ray backscattering. Specifically, the method for identifying cargo includes a process of installing a phantom having a preset location and material, a process of performing photographing under a condition of orthogonal incidence on another side of the predefined container walls, a process of normalizing an entire image, a process of generating a difference image from the normalized multi-energy backscattering image, a process of inferring a similarity with a target material, a process of detecting a location and type of the target material in the entire image, and a process of transmitting information on the location and type of the target material to a display.

20 Claims, 3 Drawing Sheets

(51) Int. Cl.

| | |
|---|---|
| *G06T 7/70* | (2017.01) |
| *G06T 7/90* | (2017.01) |
| *G06V 10/143* | (2022.01) |
| *G06V 10/30* | (2022.01) |
| *G06V 20/50* | (2022.01) |

(52) U.S. Cl.
CPC .............. *G06T 7/90* (2017.01); *G06V 10/143* (2022.01); *G06V 10/30* (2022.01); *G06V 20/50* (2022.01); *G01N 2223/401* (2013.01); *G01N 2223/639* (2013.01); *G06T 2207/10024* (2013.01); *G06T 2207/10116* (2013.01)

(58) Field of Classification Search
CPC ....... G01N 2223/401; G01N 2223/639; G01N 23/087; G01N 23/10; G01N 2223/053; G01N 2223/303; G01N 2223/408; G06T 7/70; G06T 7/90; G06T 2207/10024; G06T 2207/10116; G06T 7/0004
See application file for complete search history.

(56) References Cited

U.S. PATENT DOCUMENTS

| | | | |
|---|---|---|---|
| 2017/0160426 A1* | 6/2017 | Li | G06V 20/00 |
| 2017/0242148 A1* | 8/2017 | Yu | G01F 22/00 |
| 2017/0357026 A1* | 12/2017 | Gallagher | G01V 5/22 |
| 2020/0355631 A1* | 11/2020 | Yu | G06V 10/757 |
| 2023/0394779 A1* | 12/2023 | Jeong | G06V 10/273 |
| 2025/0352823 A1* | 11/2025 | Zhang | A61N 5/1067 |

FOREIGN PATENT DOCUMENTS

| | | |
|---|---|---|
| WO | 2008/021807 A2 | 2/2008 |
| WO | 2019/144065 A1 | 7/2019 |
| WO | 2022/008924 A1 | 1/2022 |

* cited by examiner phantom for multi-energy backscattering image calibration phantom for multi-energy backscattering image calibration placement by sample thickness placement by sample type

APPARATUS AND METHOD FOR IDENTIFYING AND DISPLAYING MATERIAL TYPES USING MULTI-ENERGY X-RAY BACKSCATTERING

CROSS REFERENCE TO RELATED APPLICATION

The present application claims priority to Korean Patent Application No. 10-2023-0124968, filed on Sep. 19, 2023, the entire contents of which are incorporated herein for all purposes by this reference.

BACKGROUND

Technical Field

The present disclosure generally relates to an imaging apparatus and, more specifically, to an apparatus and method for identifying and displaying a material type using multi-energy X-ray backscattering.

Description of the Related Art

The X-ray transmission image, which is commonly used to screen baggage and cargo for dangerous goods, may be taken in a situation where various loads are distributed in multiple layers in a container, for example, in the case of a container X-ray transmission image. A method using X-ray transmission is suitable for identifying and detecting dangerous goods made of metal materials. Meanwhile, in the case of an organic material having a lower X-ray absorption than a metal due to the transmission attenuation characteristics, it is not easy to detect since it is not well revealed when there is overlapped metal cargo around.

For such a reason, X-ray backscattering imaging technologies have been widely studied and utilized in recent years because it is possible to obtain detection images generated in a way that directly reflects the surface of an object while being relatively easy to detect by collecting material distribution information relatively close to two-dimension through collecting signals that return as backscattering from cargo distributed at a relatively certain distance within a limited space from the X-ray source using X-ray backscattering images.

In particular, in the case of a security screening imaging device such as ZBV, it has been mainly used to detect concealed cargo after moving and installing next to a cargo container while being mounted on a vehicle through obtaining backscattering images by radiating low-dose X-rays toward the side of a container and then by imaging X-ray backscattering signals that are reflected and returned. In this case, the signals reflected from the container wall are mixed with the signals reflected from the cargo during backscattering since most walls of the containers where cargo are loaded are made of metal, thereby making it difficult to detect with the naked eye, and even more difficult when an object to be detected is an organic material.

SUMMARY

On the basis of the above discussion, the present disclosure provides an apparatus and method for identifying and displaying a material type using multi-energy X-ray backscattering.

In addition, the present disclosure provides an apparatus and method for identifying cargo (material) inside a container by normalizing a container image by using a phantom.

In addition, the present disclosure provides an apparatus and method for detecting or uncovering a type of cargo loaded within a container.

In addition, the present disclosure provides an apparatus and method for identifying a type of target material within a container by using multi-energy backscattering characteristics of the target material in the container.

According to a variety of exemplary embodiments of the present disclosure, an operating method for identifying cargo in a container includes a process of installing a phantom having a preset location and material on one side of predefined container walls, a process of performing photographing under a condition of orthogonal incidence on another side of the predefined container walls by a multi-energy X-ray disposed on the one side, a process of normalizing an entire image from the result of performing photographing, a process of generating a difference image from the normalized multi-energy backscattering image, a process of inferring a similarity with a target material from the result of performing photographing, a process of detecting a location and type of the target material in the entire image on the basis of the difference image and the inferred similarity, and a process of transmitting information on the location and type of the target material to a display.

According to a variety of exemplary embodiments of the present disclosure, an apparatus for identifying cargo in a container includes a memory, a transceiver, and a controller operably connected to the memory and the transceiver, wherein the controller is capable of installing a phantom having a preset location and material on one side of predefined container walls, performing photographing under a condition of orthogonal incidence on another side of the predefined container walls by a multi-energy X-ray disposed on the one side, normalizing an entire image from the result of performing photographing, generating a difference image from the normalized multi-energy backscattering image, inferring a similarity with a target material from the result of performing photographing, detecting a location and type of the target material in the entire image on the basis of the difference image and the inferred similarity, and transmitting information on the location and type of the target material to a display.

According to a variety of exemplary embodiments of the present disclosure, a non-transitory computer readable storage medium stores one or more programs including instructions, wherein the instructions, when executed by an apparatus for detecting cargo in a container, enable the apparatus to install a phantom having a preset location and material on one side of predefined container walls, to perform photographing under a condition of orthogonal incidence on another side of the predefined container walls by a multi-energy X-ray disposed on the one side, to normalize an entire image from the result of performing photographing, to generate a difference image from the normalized multi-energy backscattering image, to infer a similarity with a target material from the result of performing photographing, to detect a location and type of the target material in the entire image on the basis of the difference image and the inferred similarity, and to transmit information on the location and type of the target material to a display.

The apparatus and method according to various exemplary embodiments of the present disclosure provide a function of normalizing a container image and a function of displaying target material to be detected in a multi-energy X-ray backscattering image where a container containing cargo is photographed by using a normalized phantom simultaneously photographed in a multi-energy X-ray backscattering image where a container containing cargo is photographed.

The effects obtained in the present disclosure are not limited to the effects mentioned above, and other effects not mentioned will be clearly understood by those skilled in the art to which the present disclosure belongs from the following description.

DETAILED DESCRIPTION OF THE DISCLOSURE

Figure 1:
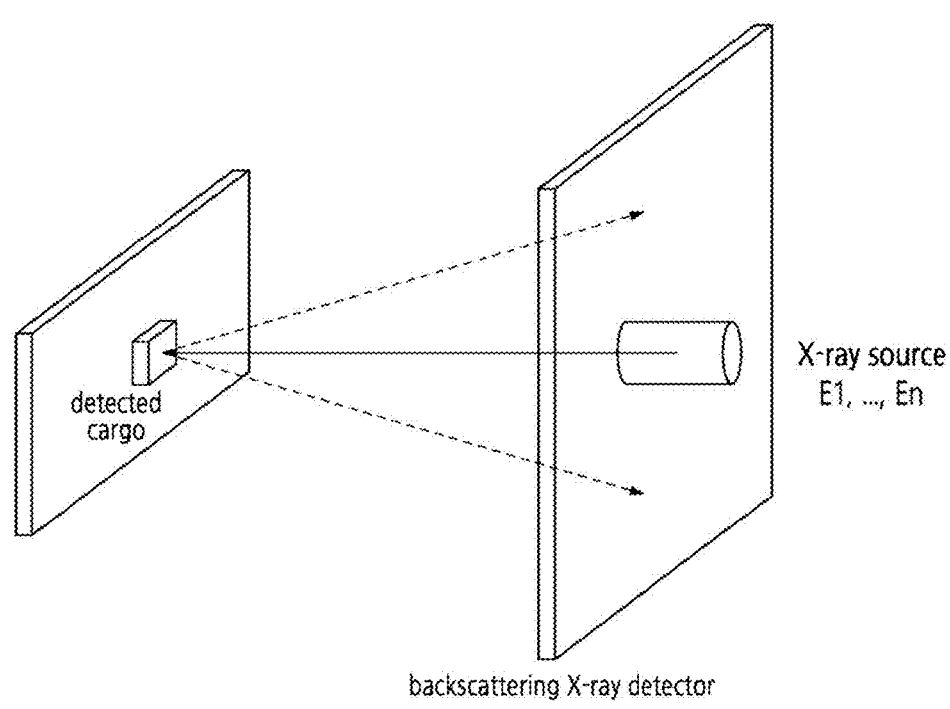
FIG. 1 is a view showing an example of an X-ray backscattering photographing apparatus for detecting cargo according to an exemplary embodiment of the present disclosure.

The terms used in the present disclosure may be used only to describe a specific exemplary embodiment and may not be intended to limit the scope of other exemplary embodiments. Singular expressions may include plural expressions unless the context clearly indicates otherwise. Terms used herein, including technical or scientific terms, may have the same meaning as those generally understood by those skilled in the art. Terms defined in the general dictionary among the terms used in the present disclosure may be interpreted as the same or similar meaning to the contextual meaning of the relevant technology and are not interpreted in an ideal or excessively formal meaning unless explicitly defined in the present disclosure. In some cases, even terms defined in the present disclosure may not be interpreted to exclude exemplary embodiments of the present disclosure.

In various exemplary embodiments of the present disclosure described below, a hardware approach method may be explained as an example. However, various exemplary embodiments of the present disclosure may not exclude a software-based approach since various exemplary embodiments of the present disclosure include techniques using both hardware and software.

In addition, "at least one of A, B and C" may mean "only A", "only B", "only C", or "any combination of A, B, and C" in the detailed description and claim of the present disclosure. In addition, "at least one of A, B, or C" or "at least one of A, B, and/or C" may mean "at least one of A, B, and C".

Hereinafter, the present disclosure may relate to an apparatus and method for identifying and displaying a material type using multi-energy X-ray backscattering. More specifically, the present disclosure may describe a function of normalizing a container image and a technology for displaying target material to be detected in a multi-energy X-ray backscattering image where a container containing cargo is photographed by using a normalized phantom simultaneously photographed in the multi-energy X-ray backscattering image where a container containing cargo is photographed.

Specifically, the present disclosure may relate to a multi-energy X-ray backscattering container image display system having a displaying method for each type of material. In order to improve the accuracy and speed of the process of detecting or uncovering various types of cargo, including concealed cargo among cargo loaded in a container of various specifications, the present disclosure may relate to a system that 1) installs a phantom having a preset location and material on the front surface of the container wall of pre-entered specifications, 2) photographs a multi-energy X-ray backscattering image under a condition of orthogonal incidence, 3) normalizes the entire image from the multi-energy photographing data for each constructed target material, 4) generates a difference image from the normalized multi-energy backscattering image, 5) infers a similarity with the target material from the multi-energy photographing data for each constructed target material, and 6) remotely transmits to a display screen the detection image where detection information such as the location and type of the target material are marked on the container image.

For example, in the border customs security screening field, which has to deal with a variety of target cargo, including not only dangerous cargo such as weapon smuggling, but also organic cargo such as concealed agricultural products and drugs, a detection method may be necessary in order to improve the efficiency and accuracy of detecting concealed cargo and dangerous cargo, wherein the detection method is capable of inferring the similarity to a specific area in the image as precisely as possible in border customs sites where an inspection is performed with the naked eye by using the multi-energy backscattering characteristics of a minimum target material.

In addition, in the case of an X-ray backscattering image, a color-coated image of the corresponding backscattering image pixel may be obtained by using the difference in backscattering characteristics by an energy of the target material, whereas a color-coated image of the transmission image pixel is obtained by using the difference in transmission characteristics by the energy of the transmission material in the case of color coding in the existing multi-energy X-ray transmission image.

Therefore, an objective of the present disclosure is to provide a function of normalizing a container image using a normalization phantom simultaneously photographed in a multi-energy X-ray backscattering image where a container containing cargo is photographed.

In addition, another objective of the present disclosure is to provide a function of displaying target material to be detected in a multi-energy X-ray backscattering image where a container containing cargo is photographed.

FIG. 1 is a view showing an example of an X-ray backscattering photographing apparatus for detecting cargo according to an exemplary embodiment of the present disclosure.

Referring to FIG. 1, the X-ray backscattering photographing apparatus for detecting cargo may install a phantom of a predetermined location and material on the front surface of container walls of the pre-entered specifications in order to improve the accuracy and speed of the process of detecting or uncovering concealed cargo in the cargo loaded on the containers of various specifications (backscattering X-ray detector).

In addition, the X-ray backscattering photographing apparatus for detecting cargo may be capable of photographing the multi-energy X-ray backscattering image under a condition of orthogonal incidence and normalizing the entire image from the multi-energy photographing data for each constructed target material. In addition, the X-ray backscattering photographing apparatus for detecting cargo may be capable of generating a difference image from the normalized multi-energy backscattering image, inferring a similarity with the target material from the multi-energy photographing data for each constructed target material, and remotely transmitting to a display screen the detection image where detection information such as the location and type of the target material are marked on the container image.

Figure 2A:
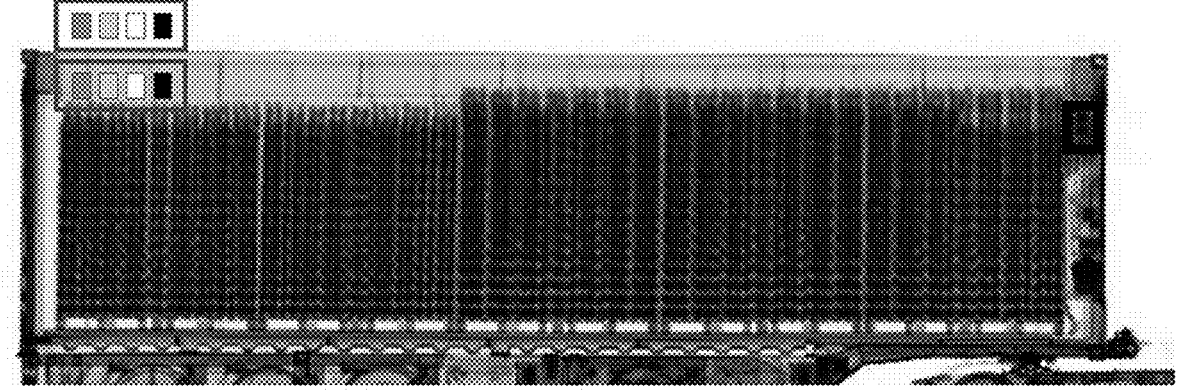
FIGS. 2A and 2B are views showing an example of a phantom for calibrating an X-ray backscattering photographing image, according to an exemplary embodiment of the present disclosure.
Figure 2B:
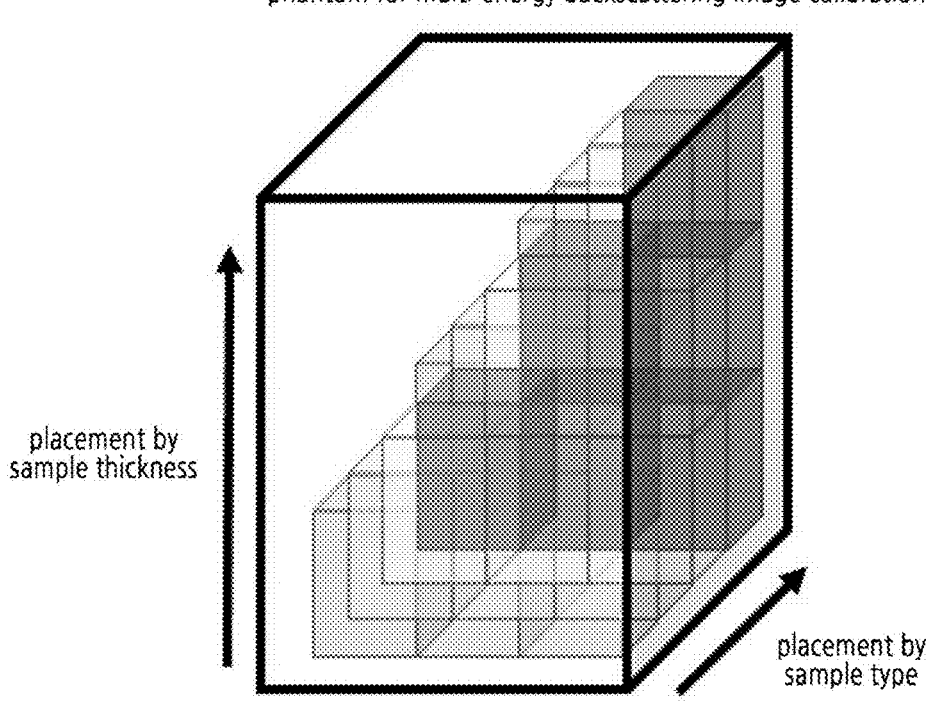

FIGS. 2A and 2B are views showing an example of a phantom for calibrating an X-ray backscattering photographing image according to an exemplary embodiment of the present disclosure. Specifically, FIGS. 2A and 2B show phantoms for calibrating an X-ray backscattering photographing image, where a combination of samples showing different backscattering characteristics, such as steel, aluminum, wood, and PVC, are placed in parallel, but not overlapping in the plane of the container, or, when unavoidable, on the side of the container that is close to the photographing equipment among the sides of the container in a location that does not overlap with the cargo, and should not be overlapped by placing side by side on one plane for each type while each sample has a different thickness when making a phantom.

The phantom for calibrating the X-ray backscattering photographing image may be based on an apparatus and method for inferring the degree of similarity to the target material from the container image and remotely transmitting to the display screen the detection image where detection information such as the location and type of the target material are marked.

In addition, the phantom may include an algorithm to remove noise generated when photographing various X-rays, and may have a form of arranging samples of multiple materials having the same thickness or multiple levels of thickness perpendicular to the plane of the container that do not overlap each other when designing the phantom for the calibration.

In the case of multiple materials, it is composed of various materials that reflect the actual loading statistics about various metals or organic materials utilized as container materials while reflecting the multi-energy backscattering characteristics.

According to an exemplary embodiment, the phantom may be installed so as not to overlap the container area. When inevitably installing at a location that appears to overlap, it is possible to install and photograph at a geometric location strictly defined in advance between the source and the external wall of the container area where cargo is not normally placed.

Figure 3:
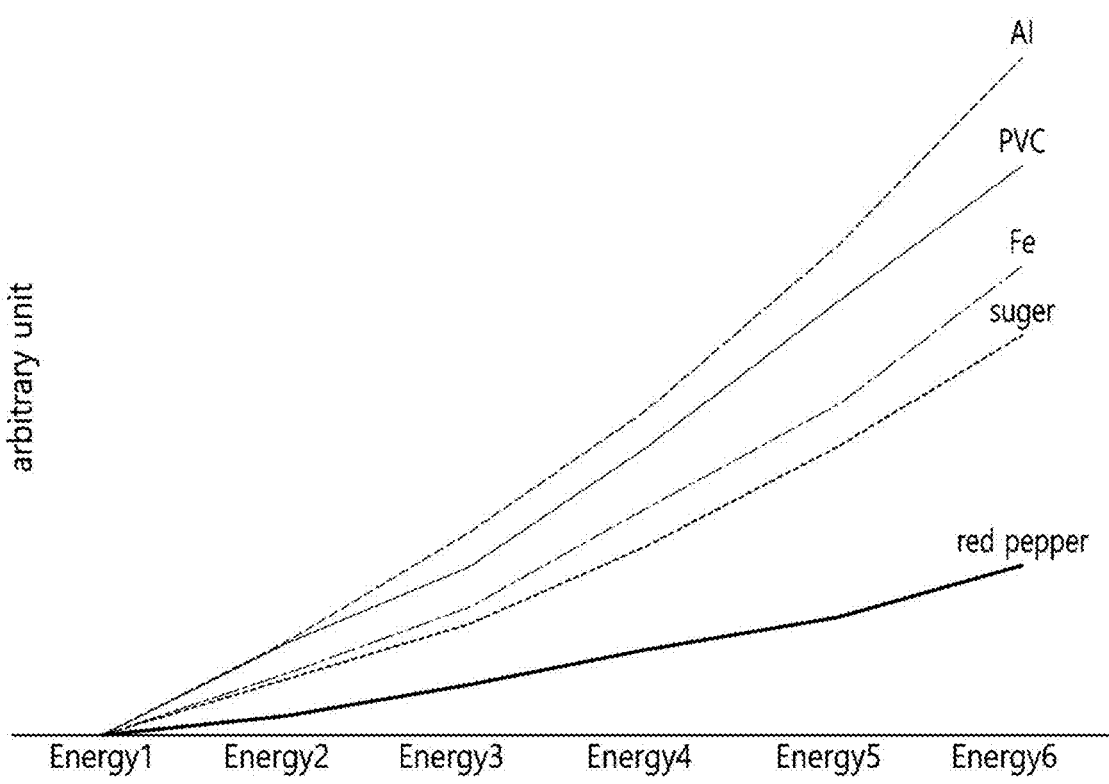
FIG. 3 is a view showing a graph of the results of measuring X-ray backscattering characteristics for each sample according to an exemplary embodiment of the present disclosure.

FIG. 3 is a view showing a graph of the results of measuring X-ray backscattering characteristics for each sample according to an exemplary embodiment of the present disclosure. Specifically, FIG. 3 shows the X-ray photographing results at different energies for aluminum, PVC, steel, sugar, and dried red pepper samples, and shows how a relative characteristic change according to energy changes is measured and utilized to classify material types.

Referring to FIG. 3, the phantom constituent material may include metals, plastics, grains, powders, and the like when constructing multi-energy photographing data for each target material. In this case, the bandwidth of the multi-energy of the X-ray source for the backscattering photographing should be the width for the backscattering characteristics of the corresponding sample to vary sufficiently (e.g., 200 to 225 kVp). When constructing data, it may be constructed using a backscattering detector of various spatial resolutions. At the time of photographing, installed may be a phantom of a combination of backscattering characteristic materials that reflect the actual loading statistics about various metals or organic materials utilized as container materials.

A method that calibrates a loaded container image by selecting from a database of empty container images an empty container image with the same geometric conditions and the same wavelength band as the actually photographed loaded container image may perform 1) selecting images photographed at wavelengths that match or are similar to a plurality of X-ray wavelengths of the photographing system, 2) automatically or manually identifying a phantom area for calibration simultaneously photographed after installing not to be overlapped with the container area when photographing the loaded container image 3) determining the color tone conversion formula through a linear or non-linear regression so that the two areas have statistically the same brightness distribution, and 4) applying this formula to the entire loaded container image in order to convert the image and perform calibration.

When the corresponding wavelength and spatial resolution between the loaded container image and the empty container image may not accurately match, a new empty container image may be inferred and constructed under the loaded container image conditions from images of two or more adjacent conditions using a linear or nonlinear regression method.

The apparatus and method for detecting cargo of the present disclosure may be mounted with machine learning such as deep learning or other algorithms, which are applied to the image provided just before transmission, for determining the location and type of the target material to be detected in order to transmit detection information such as the location and type of target material in the container image to a remote detection display screen.

In order to improve the accuracy and speed of the process of detecting or uncovering various types of cargo, including concealed cargo among cargo loaded in containers of various specifications according to various exemplary embodiments of the present disclosure, 1) a phantom of a preset location and material may be installed on the front surface of the container walls of pre-entered specifications, 2) multi-energy X-ray backscattering images may be photographed under a condition of orthogonal incidence, 3) the entire image from the multi-energy photographing data may be normalized for each constructed target material, 4) a difference image from the normalized multi-energy backscattering image may be generated, 5) the similarity with the target material from the multi-energy photographing data for each constructed target material may be inferred, and 6) a detection image where detection information such as the location and type of the target material is marked on the container image may be remotely transmitted the display screen.

According to an exemplary embodiment, the system may include an algorithm to remove noise generated during various X-ray photographing, such as noise caused by low-dose backscattering photographing, and may have a form of arranging samples of multiple materials having the same thickness or multiple levels of thickness perpendicular to the plane of the container that does not overlap each other when designing the phantom for the calibration. In the case of multiple materials, it may be composed of various materials that reflect the actual loading statistics about various metals or organic materials utilized as container materials. The phantom may be installed so as not to overlap with the container area. In unavoidable cases, the phantom may be installed in a predetermined location under a condition where the loaded cargo is not overlapped when photographing the backscattering usually on the front side of the container wall.

According to an exemplary embodiment, a method that calibrates a loaded container image by selecting from a database of empty container images an empty container image with the same geometric conditions and the same wavelength band as the actually photographed loaded container image may perform 1) selecting images photographed at wavelengths that match or are similar to a plurality of X-ray wavelengths of the photographing system, 2) automatically or manually identifying a phantom area for calibration simultaneously photographed after installing not to be overlapped with the container area when photographing the loaded container image 3) determining the color tone conversion formula through a linear or non-linear regression so that the two areas have statistically the same brightness distribution, and 4) applying this formula to the entire loaded container image in order to convert the image and perform calibration.

According to an exemplary embodiment, when the corresponding wavelength and spatial resolution between the loaded container image and the empty container image do not accurately match, a new empty container image may be inferred and constructed under the loaded container image conditions from images of two or more adjacent conditions using a linear or nonlinear regression method.

According to an exemplary embodiment, the image may be inferred and calibrated by defining using a linear or non-linear regression method a formula that compares and similarly matches the shading distribution of the container skeleton portion backscattered from empty areas, such as ceilings and floors where loads are not normally photographed, in order to overcome the fact that there is no phantom area for comparison when applying the detection and display system to an existing container backscattering photographing image.

According to an exemplary embodiment, a method of generating an inter-energy difference image from a normalized multi-energy backscattering image may determine a plurality of energy bands in which target material detection performance can be optimized with the most contrasting backscattering characteristics between target materials from the multi-energy photographing data for each constructed target material, and construct a difference image by generating each pixel value as a difference in backscattering characteristic parameter values between the two corresponding energies.

According to an exemplary embodiment, a method of inferring the similarity with the target material from the multi-energy photographing data for each constructed target material may 1) calculate the similarity between the pixel value of the difference image constructed for the multi-energy backscattering photographing image photographed for the container and the photographed data of the energy corresponding to the constructed target material, and 2) determine whether the target material is present by comparing the average similarity value within the area of interest with a pre-determined threshold value.

According to an exemplary embodiment, the detection and display system may have machine learning such as deep learning, or other algorithms which are applied to the image provided just before transmission for determining the location and type of the target material to be detected, in order to transmit detection information such as the location and type of target material in the container image to the remote detection display screen.

Through this, the present disclosure may facilitate the detection of concealed cargo such as metals, organics, and grains, smuggled agricultural products, drugs, and illegal immigrants by detecting the target material for a multi-energy backscattering image photographed by specifying the target material with backscattering characteristics known in advance, thereby contributing to public health and safety thanks to the resultant effects in actual border surveillance sites where it is difficult to remove all the cargo in the loaded container and to inspect the cargo one by one and it is not possible to photograph empty container images whereas backscattered X-ray images photographed by the reflection of steel container boxes with non-simple patterns are added to existing cargo images to make the detection highly difficult.

Figure 4:
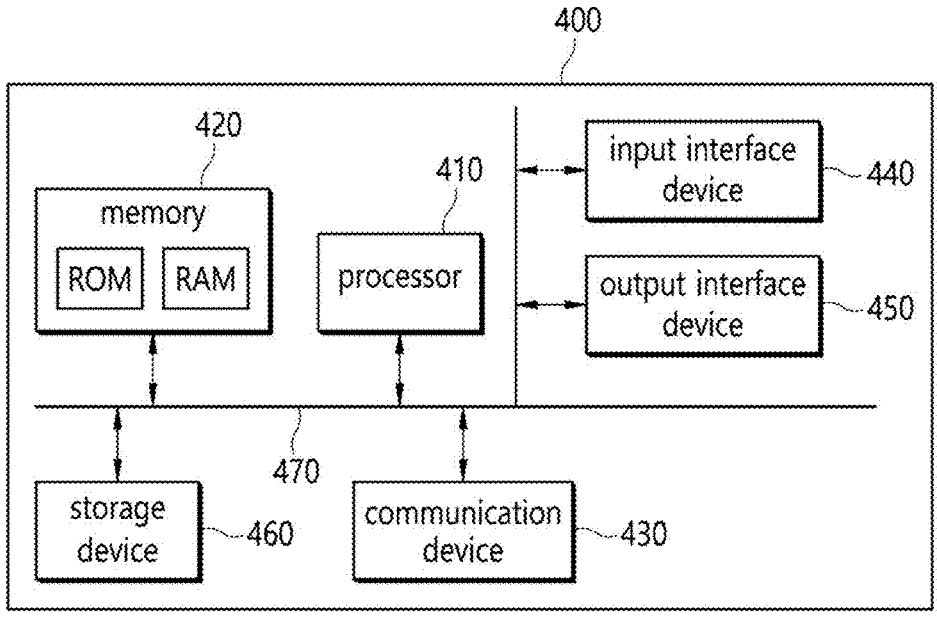
FIG. 4 is a view showing a configuration diagram of an apparatus for identifying cargo in a container according to an exemplary embodiment of the present disclosure.

FIG. 4 is a view showing a configuration diagram of an apparatus for identifying cargo in a container according to an exemplary embodiment of the present disclosure.

Referring to FIG. 4, the apparatus 400 for identifying cargo in a container may include at least one processor 410, a memory 420, and a communication device 430 configured to perform communication while connected to a network. In addition, the apparatus 400 for identifying cargo in the container may further include an input interface device 440, an output interface device 450, a storage device 460, and the like. The respective components included in the apparatus 400 for identifying cargo in the container may be connected by the buses 470 to communicate with each other.

However, the respective components included in the apparatus 400 for identifying cargo in the container may be connected to each other through individual interfaces or individual buses centered on the processor 410 instead of the common bus 470. For example, the processor 410 may be connected through a dedicated interface to at least one of the memory 420, the communication device 430, the input interface device 440, the output interface device 450, and the storage device 460.

The processor 410 may execute a program command stored in at least one of the memory 420 and the storage device 460. The processor 410 may refer to a central processing unit (CPU), a graphics processing unit (GPU), or a dedicated processor in which methods according to exemplary embodiments of the present disclosure are performed. Each of the memory 420 and the storage device 460 may be composed of at least one of a volatile storage medium and a nonvolatile storage medium. For example, the memory 220 may be composed of at least one of a read only memory (ROM) and a random access memory (RAM).

Methods according to exemplary embodiments described in the claims or specification of the present disclosure may be implemented in the form of hardware, software, or a combination of hardware and software.

When implemented in software, a computer-readable storage medium for storing one or more programs (software modules) may be provided. One or more programs stored in a computer-readable storage medium may be configured to be executable by one or more processors in an electronic device (configured for execution). One or more programs may include instructions that lead the electronic device to execute methods according to the exemplary embodiments described in the claims or specification of the present disclosure.

Such programs (software modules, software) may be stored in a random access memory, a nonvolatile memory including a flash memory, a read-only memory (ROM), an electrically erasable programmable read only memory (EE-PROM), a magnetic disc storage device, a compact disc-ROM (CD-ROM), a digital versatile disc (DVDs), or other forms of optical storage device, or a magnetic cassette. Alternatively, it may be stored in a memory consisting of a combination of some or all of these. In addition, each configuration memory may be included in a plurality.

In addition, the program may be stored in an attachable storage device that may be accessible through a communication network such as the internet, an intranet, a local area network (LAN), a wide area network (WAN), or a storage area network (SAN), or a combination thereof. Such a storage device may be accessible from a device performing an exemplary embodiment of the present disclosure through an external port. In addition, a separate storage device on the communication network may access a device performing an exemplary embodiment of the present disclosure.

In the above-described specific exemplary embodiments of the present disclosure, components included in the present disclosure may be expressed in singular or plural according to the presented specific exemplary embodiment. However, singular or plural expressions may be selected appropriately for the situation presented for convenience of explanation, and the present disclosure may be not limited to singular or plural components, and even a component expressed in the plural may be composed of a singular component, or a component expressed in the singular may be composed of plural components.

Meanwhile, in the detailed description of the present disclosure, specific exemplary embodiments have been described, but various modifications are possible without departing from the scope of the present disclosure. Therefore, the scope of the present disclosure should not be limited to the described exemplary embodiments, but should be determined not only by the scope of the patent claims to be described below, but also by the scope and equivalents of these patent claims.

What is claimed is:

1. An operating method for identifying cargo in a container, the method comprising:
    a process of installing a phantom having a preset location and a material on one side of predefined container walls;
    a process of performing photographing under a condition of orthogonal incidence on another side of the predefined container walls by a multi-energy X-ray disposed on the one side;
    a process of normalizing an entire image from a result of performing photographing;
    a process of generating a difference image from the normalized multi-energy backscattering image;
    a process of inferring a similarity with a target material from the result of performing photographing;
    a process of detecting a location and type of the target material in the entire image on the basis of the difference image and the inferred similarity; and
    a process of transmitting information on the location and type of the target material to a display.

2. The method of claim 1, wherein the result of performing photographing is multi-energy photographing data for each constructed target material.

3. The method of claim 1, wherein the process of performing photographing comprises a process of removing a noise generated when performing photographing.

4. The method of claim 1, wherein the phantom has a form where a plurality of samples of materials having the same thickness are arranged in a plane perpendicular to a source-detector axis without overlapping each other.

5. The method of claim 4, wherein the plurality of materials comprise various materials that reflect actual loading statistics about various metals or organic materials utilized as container materials.

6. The method of claim 1, wherein the phantom is installed so as not to overlap a container area and is installed on the one side of the container walls at a predetermined location under a condition that a loaded cargo is not overlapped during normal backscattering photographing.

7. The method of claim 1, wherein the process of performing photographing comprises a process of calibrating a loaded container image on the basis of an empty container image,
    wherein the calibrating process comprises
    a process of identifying the empty container image photographed with a wavelength that matches or is similar to the loaded container image;
    a process of automatically or manually identifying a placement of the phantom so as not to overlap a container area when photographing the loaded container image;
    a process of determining a color tone conversion formula through a linear or non-linear regression so that the loaded container image and the identified empty container image have statistically the same brightness distribution; and
    a process of applying the color tone conversion formula to the entire image for conversion.

8. The method of claim 7, wherein the process of determining the color tone conversion formula comprises a process of inferring and reconstructing a new empty container image according to the loaded container image condition from images of two or more adjacent conditions using the linear or nonlinear regression method when a geometric condition, wavelength, and spatial resolution between the loaded container image and the empty container image do not exactly match.

9. The method of claim 1, wherein the process of inferring the similarity with the target material from the result of performing photographing comprises
    a process of calculating a similarity between a pixel value of the difference image constructed for a multi-energy backscattering photographing image photographed for the container and the photographed data of an energy corresponding to the constructed target material, and
    a process of identifying the target material by comparing an average similarity value within an area of interest with a pre-determined threshold value.

10. The method of claim 1, wherein the process of applying the color tone conversion formula to the entire image for conversion comprises
    a process of identifying a plurality of energy bands in which the target material detection performance is optimized wherein the backscattering characteristics between target materials are most contrasted from multi-energy photographing data for each constructed target material, and a process of generating a difference image by generating each pixel value on the basis of a difference in backscattering characteristic parameter values between the plurality of energy bands.

11. An apparatus for identifying cargo in a container, the apparatus comprising:

a memory;

a transceiver; and a controller operably connected to the memory and the transceiver;

wherein the controller is capable of installing a phantom having a preset location and a material on one side of predefined container walls, performing photographing under a condition of orthogonal incidence on another side of the predefined container walls by a multi-energy X-ray disposed on the one side, normalizing an entire image from a result of performing photographing, generating a difference image from the normalized multi-energy backscattering image, inferring a similarity with a target material from the result of performing photographing, detecting a location and type of the target material in the entire image on the basis of the difference image and the inferred similarity, and transmitting information on the location and type of the target material to a display.

12. The apparatus of claim 11, wherein the result of the performing photographing is multi-energy photographing data for each constructed target material.

13. The apparatus of claim 11, wherein the controller removes a noise generated when performing photographing in order to perform photographing.

14. The apparatus of claim 11, wherein the phantom has a form where a plurality of samples of materials having the same thickness are arranged in a plane perpendicular to a source-detector axis without overlapping each other.

15. The apparatus of claim 14, wherein the plurality of materials comprise various materials that reflect actual loading statistics about various metals or organic materials utilized as container materials.

16. The apparatus of claim 11, wherein the phantom is installed so as not to overlap a container area and is installed on one side of container walls at a predetermined location under a condition that a loaded cargo is not overlapped during normal backscattering photographing.

17. The apparatus of claim 11, wherein the controller infers and reconstructs a new empty container image according to a loaded container image conditions from images of two or more adjacent conditions using a linear or nonlinear regression method in order to determine the color tone conversion formula when a geometric condition, wavelength, and spatial resolution between the loaded container image and the empty container image do not exactly match.

18. The apparatus of claim 11, wherein the controller calculates a similarity between a pixel value of the difference image constructed for a multi-energy backscattering photographing image photographed for the container and a photographed data of an energy corresponding to the constructed target material, and identifies the target material by comparing an average similarity value within an area of interest with a predetermined threshold value, in order to infer the similarity with the target material from the result of performing photographing.

19. The apparatus of claim 11, wherein the controller identifies a plurality of energy bands in which the target material detection performance is optimized wherein the backscattering characteristics between target materials are most contrasted from multi-energy photographing data for each constructed target material, and generates a difference image by generating each pixel value on the basis of a difference in a backscattering characteristic parameter value between the plurality of energy bands in order to apply the color tone conversion formula to the entire image for conversion.

20. A non-transitory computer-readable storage medium for storing one or more programs comprising instructions, wherein the instructions, when executed by an apparatus for detecting cargo in a container, enable the apparatus to install a phantom having a preset location and a material on one side of predefined container walls, to perform photographing under a condition of orthogonal incidence on another side of the predefined container walls by a multi-energy X-ray disposed on the one side, to normalize an entire image from a result of performing photographing, to generate a difference image from the normalized multi-energy backscattering image, to infer a similarity with a target material from the result of performing photographing, to detect a location and type of the target material in the entire image on the basis of the difference image and the inferred similarity, and to transmit information on the location and type of the target material to a display.

* * * * *